United States Patent [19]

Tanaka

[11] Patent Number: 4,646,883
[45] Date of Patent: Mar. 3, 1987

[54] HYDRAULIC SHOCK ABSORBER

[75] Inventor: Toshio Tanaka, Susono, Japan

[73] Assignee: Toyota Jidosha Kabushiki Kaisha, Aichi, Japan

[21] Appl. No.: 780,819

[22] Filed: Sep. 27, 1985

[30] Foreign Application Priority Data

Nov. 13, 1984 [JP] Japan .............................. 59-172836[U]

[51] Int. Cl.⁴ ................................................ F16F 9/34
[52] U.S. Cl. .................................. 188/282; 137/493.8; 188/317; 188/322.15; 188/322.22
[58] Field of Search ....................... 188/322.15, 322.13, 188/322.22, 282, 281, 317, 322.14; 92/181 P; 137/493.8, 516.11–516.23, 493; 92/172

[56] References Cited

U.S. PATENT DOCUMENTS

| | | | |
|---|---|---|---|
| 3,078,965 | 2/1963 | DeCarbon et al. | 188/322.15 X |
| 3,519,109 | 7/1970 | Whisler, Jr. | 188/282 X |
| 4,113,072 | 9/1978 | Palmer | 137/493.8 X |
| 4,460,074 | 7/1984 | Muller et al. | 188/322.14 |

Primary Examiner—Douglas C. Butler
Attorney, Agent, or Firm—Finnegan, Henderson, Farabow, Garrett & Dunner

[57] ABSTRACT

A hydraulic shock absorber exhibiting a constant vibration damping force. The shock absorber is provided with a deep groove formed on an upper surface of a piston in a circle where piston ports formed through the piston lie and communicated with the piston ports. The groove has an outer peripheral wall in such a manner that an upper opening is upwardly enlarged.

9 Claims, 6 Drawing Figures

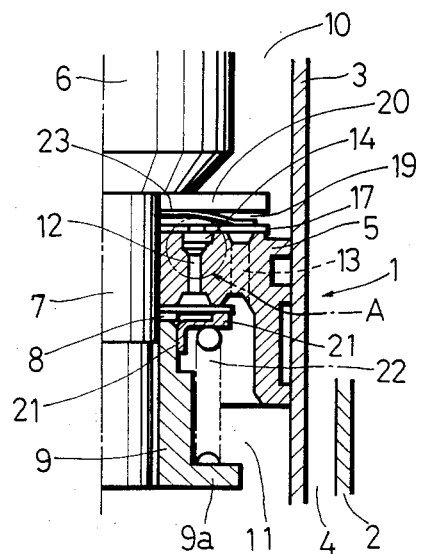
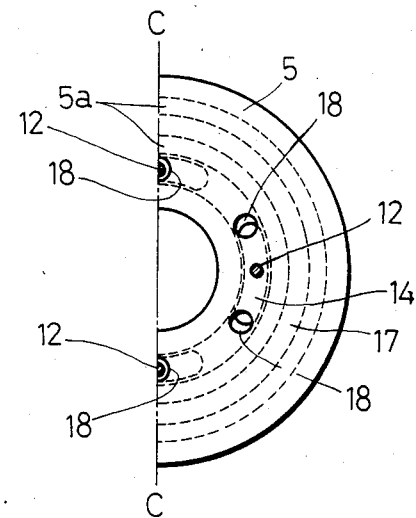
FIG. 1  FIG. 2
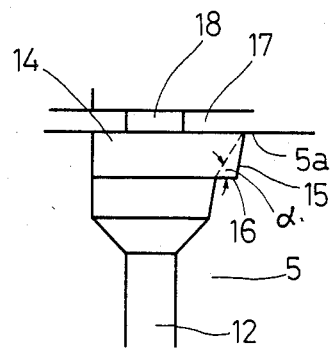
FIG. 3

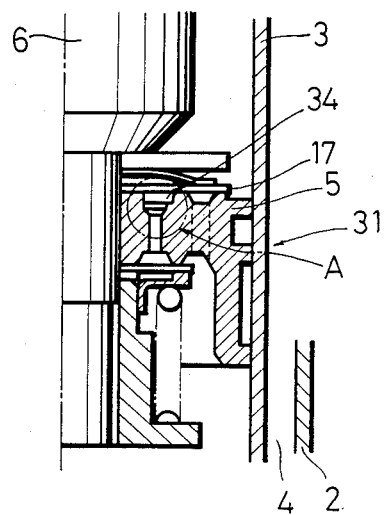
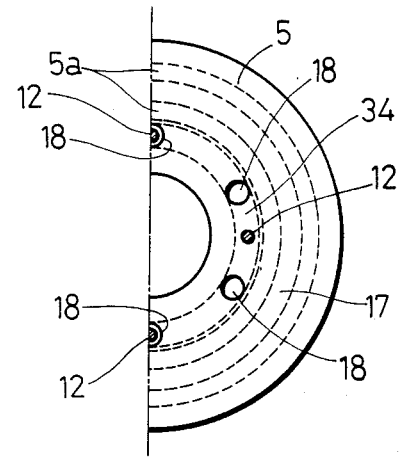
FIG.4    FIG.5
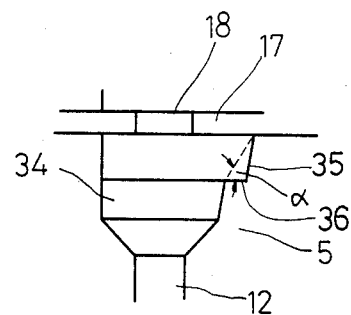
FIG.6

HYDRAULIC SHOCK ABSORBER

BACKGROUND OF THE INVENTION (1) Field of the Invention

This invention relates to a hydraulic shock absorber of such a type that it is primarily used for a suspension device for an automobile, and a vibration damping force is generated by utilizing restriction resistance of fluid.

(2) Description of the Prior Art

The hydraulic shock absorber of the above-mentioned type generally includes a cylinder which is oil-tightly separated into a piston upper chamber and a piston lower chamber by a piston reciprocating in the cylinder. The piston is provided with a plurality of piston ports in a circle for communicating the piston upper chamber with the piston lower chamber, and is further provided with a plurality of return ports in a circle outside of the piston ports for communicating the piston upper chamber with the piston lower chamber. A sheet ring-like non-return valve is arranged above the piston and slidably fitted to a piston rod. The non-return valve is provided with valve holes opposed to the piston ports. A ring-like non-return valve stopper is arranged above the non-return valve with a small space defined between the valve stopper and the non-return valve, and is fixed to the piston rod. The non-return valve is biased against an upper surface (seal surface) of the piston by a spring interposed between the non-return valve and the valve stopper. Each inlet of the piston ports is communicated with each groove (arcuate grooves or ring groove) formed on the seal surface of the piston along a circle where the piston ports lie. If the piston ports are completely registered with the valve holes, this groove is not required to be provided. However, as the piston ports are offset from the valve holes upon installation of the hydraulic shock absorber, this groove is provided for purpose of communication of the piston ports and the valve holes irrespective of the offset of the former from the latter. When the piston is moved to the piston upper chamber to allow oil to flow from the piston upper chamber through the piston ports to the piston lower chamber, and at this time, there is created a restricting action against oil flow. Upon receiving impact, a vibration damping force against the impact is generated by the restricting action. During flowing of the oil from the piston upper chamber to the piston lower chamber, the return port is closed by the non-return valve to block communication of the oil. On the other hand, during flowing of the oil from the piston lower chamber, the non-return valve is pushed up from the seal surface of the piston to allow the oil to flow in the return port, and the piston ports are closed by a check valve provided under the piston ports. In this manner, it is designed that vibration damping characteristics in the upward and downward actions are different.

The piston is generally made of sintered materials so as to improve moldability, and a depth of the groove is small so as to secure a strength of the seal surface. Further, iron powder is scattered on the seal surface outside of the groove, and is deposited by burning. However, in the case that the depth of the groove is small, there is a possibility that the vibration damping force is varied according to a positional relation between the valve holes and the inlets of the piston ports upon installation of the shock absorber, and because of fluctuation in resistance of the oil flowing from the valve holes through the grooves to the inlets of the piston ports.

SUMMARY OF THE INVENTION

It is an object of the present invention to provide a hydraulic shock absorber which may exhibit a constant vibration damping force in receipt of impact irrespective of positional offset between the non-return valve holes and the piston ports.

According to the present invention, in the hydraulic shock absorber including a piston reciprocating in a cylinder, a piston upper chamber and a piston lower chamber which are oil-tightly separated by the piston, a plurality of piston ports formed through the piston in a circle for communicating the piston upper chamber with the piston lower chamber, a plurality of return ports formed outside of the piston ports in a circle for communicating the piston upper chamber with the piston lower chamber, a sheet ring-like non-return valve provided above the piston and slidably fitted to a piston rod, a plurality of valve holes formed through the non-return valve in opposed relation with the piston ports, a ring-like non-return valve stopper fixed to the piston rod on an upper side of the non-return valve with a small space defined between the non-return valve and the non-return valve stopper, a spring interposed between the non-return valve and the non-return valve stopper for normally urging the non-return valve to an upper surface of the piston, wherein movement of the piston to the piston upper chamber allows oil to flow from the piston upper chamber through the piston ports of the piston lower chamber, while the return ports are closed by the non-return valve to generate a vibration damping force by resistance upon pass of the oil through the piston ports, an improvement comprises a deep groove formed on an upper surface of the piston in the circle where the piston ports lie and communicated with the piston ports, the groove having an outer peripheral wall in such a manner that an upper opening is upwardly enlarged.

When this arrangement, even when the valve holes of the non-return valve are not registered with the piston ports upon installation of the hydraulic shock absorber, the valve holes may be communicated through the deep groove to the piston ports. Accordingly fluidic resistance created among the valve holes, the groove and an inlet of the piston ports is not varied irrespective of fluctuation in relative positional relation between the inlets of the piston ports and the valve holes thereby to completely prevent ununiformity of the vibration damping force in receipt of impact. The depth of the groove is such that the fluidic resistance created among the valve holes, the groove and the inlet of the piston ports is smaller than that created in the piston ports. Furthermore, as the outer peripheral wall of the groove is designed in such that the upper opening of the groove is upwardly enlarged, the strength of the piston is not reduced for the following reasons irrespective of the fact that the groove is deep.

First, a die for the piston is compressed vertically before sintering of the piston and is formed into a shape corresponding to the piston. At this time, the vertically longer a vertical surface of the die, it is found that the harder a compression ratio of a sintered material is increased. Therefore, a strength of the sintered product may be increased by providing a shoulder on the vertical surface to divide a vertical distance, or by providing a slant surface.

Next, in case of scattering iron powder on an inner surface of the die so as to increase a strength of the seal surface of the piston in molding the sintered material, the iron powder is hardly deposited to the vertical surface, but it is easily deposited to a slant surface. Therefore, the seal surface of the piston may be reinforced by the iron powder by providing a slant surface on the inner surface of the die.

Further, if the valve holes are arranged on the non-return valve at equal intervals, and an angle formed by each of the arcuate grooves is equal to or greater than an angle divided from 360 degrees by the number of the valve holes, the arcuate grooves are always communicated with the valve holes irrespective of relative positional relation between the piston and the non-return valve. The smaller the angle formed by each of the arcuate grooves, the greater the strength of the piston is. On the other hand, the less the number of the valve holes is, the greater the strength of the non-return valve is. As a result, an optimum number of the valve holes for balancing the strength of both the piston and the non-return valve is given by the following manner. That is, the number of the valve holes is set to be less than the number permitting the strength of the non-return valve to be retained, and the angle formed by each of the arcuate grooves is set to be less than an angle permitting the strength of the piston to be retained.

The invention will be more fully understood from the following detailed description and appended claims when taken with the drawings.

BRIEF DESCRIPTION OF THE DRAWINGS

FIG. 1 is a vertical sectional view of a first preferred embodiment with a right half only shown;

FIG. 2 is a plan view with a right half only shown;

FIG. 3 is an enlarged view of an essential part A in FIG. 1;

FIG. 4 is a vertical sectional view of a second preferred embodiment similar to FIG. 1;

FIG. 5 is a plan view similar to FIG. 2; and

FIG. 6 is an enlarged view of an essential part A in FIG. 4.

DETAILED DESCRIPTION OF THE PREFERRED EMBODIMENTS

Referring to FIGS. 1 to 3 which show a first preferred embodiment of the present invention, a shock absorber 1 includes an outer cylinder 2 and an inner cylinder 3 arranged coaxially with the outer cylinder 2. A reservoir chamber 4 is defined between the outer cylinder 2 and the inner cylinder 3. The present invention is naturally adapted to a mono-tube type shock absorber, in which case the reservoir chamber 4 is not required. A piston 4 made of sintered metal is oil-tightly reciprocatably inserted in the inner cylinder 3. The piston 5 is fitted to a lower small-diametrical portion 7 of a piston rod 6, and is fixed through a sheet-like main valve 8 to the piston rod 6 by a securing nut 9. The main valve 8 is formed of elastic materials, and functions to open and close an outlet portion of piston ports. The inner cylinder 3 is oil-tightly separated into a piston upper chamber 10 and a piston lower chamber 11 by the piston 5.

The piston 5 is provided with piston ports 12 for communicating the piston upper chamber 10 with the piston lower chamber 11, and return ports 13 for communicating the piston upper chamber 10 with the piston lower chamber 11 on the outside of the piston ports 12.

An upper surface of the piston 5 serves as a seal surface 5a, and the seal surface 5a is provided with a plurality of arcuate deep grooves 14 (four grooves shown) concentric with the piston 5 which grooves are communicated with the piston ports 12. An outer circumferential wall 15 of the arcuate grooves 14 is provided with a shoulder 16. Iron powder is scattered on the seal surface 5a outside of the arcuate grooves 14, and is bonded to the seal surface 5a during sintering of the piston 5. As shown by a dotted line in FIG. 3, the outer circumferential wall 15 may be formed with a slant wall having a slant angle $\alpha$ instead of the shoulder 16. In any case, the outer circumferential side surface of the grooves is reinforced by the iron powder. The piston ports 12 is opened at substantially central portion of the arcuate grooves 14. A sheet ring-like non-return valve 17 is located on the seal surface 5a, and is loosely fitted to the lower small-diametrical portion 7 of the piston rod. The non-return valve 17 covers the arcuate grooves 14 and an opening portion of the return ports 13 on the piston seal surface. The non-return valve 17 is provided with six valve holes 18 in such a manner that each of the valve holes 18 is positioned at each vertex of a regular hexagon. A length of the grooves 14 is designed in such that the grooves 14 may be sufficiently communicated with the piston upper chamber even when the piston is displaced from the non-return valve at every relative angular position. Therefore, an angle to be formed by the grooves 14 is set to 60 degrees (360 degrees/6).

A non-return valve stopper 20 is fixed to a step portion between the piston rod 6 and the lower small-diametrical portion 7 on the upper side of the non-return valve 17 with a small space 19 defined between the stopper 20 and the valve 17. A ring-like Belleville spring 23 is loosely fitted to the lower small-diametrical portion 7 in the small space 19, so as to allow the non-return valve 17 to be in tight contact with the seal surface 5a of the piston 5. The non-return valve 17 completely covers an upper opening of the return ports 13.

A spring bearing 21 is provided on the lower surface of the main valve 8, and a compression spring 22 is inserted between the spring bearing 21 and a flange portion 9a of the securing nut 9. The lower opening of the piston ports 12 is closed by the main valve 8 at rest of the piston 5 and when oil flows from the piston lower chamber to the piston upper chamber.

With the above-mentioned constitution, oil pressure in the piston upper chamber 10 is greater than that in the piston lower chamber 11 on an expansion side of the hydraulic shock absorber 1 (under a lifting condition of the piston 5 in FIG. 1). Accordingly, oil acts to push down the outer peripheral portion of the main valve 8 against a spring force of the compression spring 22, and is allowed to flow into the piston lower chamber 11. At this time, the oil in the piston upper chamber 10 is supplied through the small space 19 between the non-return valve 17 and the non-return valve stopper 20 and a valve hole 18 to the arcuate grooves 14 and then fed to the piston ports 12. In this manner, as the grooves 14 are communicated with the piston upper chamber over a sufficient cross-sectional area, constant restricting effect between the valve hole 18 and the arcuate grooves 14 may be obtained at all times, and constant shock absorbing force may be obtained at all times. The return ports 13 on the expansion side of the hydraulic shock absorber 1 is closed by the non-return valve 17 to block communication of the oil.

On a contraction side of the hydraulic shock absorber 1, that is, when the piston 5 is lowered, the pressure in the piston lower chamber 11 is greter than that in the piston upper chamber 10. Accordingly, the lower opening of the piston ports 12 is closed by the main valve 8, and the oil is fed from the piston lower chamber 11 through the return ports 13 to the piston upper chamber 10.

Referring next to FIGS. 4 to 6 which show a second preferred embodiment of the present invention, a hydraulic shock absorber 31 is of structure similar to that of the hydraulic shock absorber 1 in the first preferred embodiment except that the hydraulic shock absorber 31 is provided with a ring groove 34. An outer peripheral wall 35 of the ring groove 34 is formed with a shoulder 36 or a slant surface having a slant angle $\alpha$ in the same manner as in the first preferred embodiment. With this structure, a strength of the piston 5 may be secured irrespective of provision of the annular groove 34. The other constitution is the same as of the first preferred embodiment. Operation or effect of this embodiment is also the same as of the first preferred embodiment.

As is above described, since the restriction effect by the valve holes and the circumferentially extending grooves (arcuate grooves 14 or ring groove 34) is always constant, it is possible to obtain a constant shock absorbing force against the shock on the expansion side of the hydraulic shock absorber irrespective of a mount position of the non-return valve 17.

Further, since the outer peripheral wall of the grooves is formed with the shoulder or the slant surface, there is no possibility that the strength of the piston is reduced even if the groove has a considerable depth.

Having thus described the preferred embodiments of the invention, it should be understood that numerous structural modifications and adaptations may be restored to without departing from the spirit of the invention.

What is claimed is:

1. In a hydraulic shock absorber including a piston reciprocating in a cylinder, a piston upper chamber and a piston lower chamber which are oil-tightly separated by said piston, a plurality of piston ports formed through said piston in a circle for communicating said piston upper chamber with said piston lower chamber, a plurality of return ports formed outside of said piston ports in a circle for communicating said piston upper chamber with said piston lower chamber, a sheet ring-like non-return valve provided above said piston and fitted to a piston rod, a plurality of valve holes formed through said non-return valve in opposed relation with said piston ports, a ring-like non-return valve stopper fixed to said piston rod on an upper side of said non-return valve with a small spaced defined between said non-return valve and said non-return valve stopper, a spring interposed between said non-return valve and said non-return valve stopper for normally urging said non-return valve to an upper surface of said piston, wherein movement of said piston to said piston upper chamber allows oil to flow from said piston upper chamber through said piston ports to said piston lower chamber, while said return ports are closed by said non-return valve to generate a vibration damping force by resistance upon pass of said oil through said piston ports, the improvement comprising a groove formed in an upper surface of said piston facing said non-return valve and aligned with said valve holes, said groove being in the circle where said piston ports lie and being in communication with said piston ports, said groove having a depth such that resistance to oil flow through said groove is substantially less than the resistance to oil flow through said piston ports while said piston is rising within said cylinder, whereby upon angular displacement of said valve holes the resistance to oil flow through said piston is substantially unchanged although the oil travel distance through the piston may have increased, said groove having an outer peripheral wall in such a manner that said groove tapers outwardly toward the upper surface of said piston, said outer peripheral wall is reinforced with bonded iron powder and said piston is made of sintered materials.

2. The hydraulic shock absorber as defined in claim 1, wherein said outer peripheral wall of said groove is formed with a shoulder.

3. The hydraulic shock absorber as defined in claim 1, wherein said outer peripheral wall of said groove is formed with a slant surface.

4. The hydraulic shock absorber as defined in claim 1, wherein said groove includes a plurality of arcuate groove segments arranged on said upper surface of said piston at equal intervals, and said valve holes are arranged at equal intervals, and an angle formed by each of said arcuate groove segments is equal to or greater than 360 degrees divided by the number of said valve holes.

5. The hydraulic shock absorber as defined in claim 4, wherein said number of said valve holes is less than the number permitting a strength of said non-return valve to be retained, and said angle formed by each of said arcuate groove segments is less than an angle permitting a strength of said piston to be retained.

6. A vibration damping shock absorber utilizing a hydraulic liquid comprising:
a cylinder;
a piston for reciprocating on a piston rod in said cylinder, said piston and said cylinder defining an upper chamber above said piston and a lower chamber below said piston, said piston having a plurality of piston ports formed through said piston in a circle and a plurality of return ports formed through said piston in another circle radially outward of said piston ports, said piston ports and said return ports communicating said upper chamber with said lower chamber;
a non-return valve formed in a ring-like plane and fitted on said piston rod above an upper surface of said piston, said non-return valve having a plurality of valve holes formed through said non-return valve in a circle in opposed relation with said circle of piston ports;
spring means for biasing said non-return valve against the upper surface of said piston;
the upper surface of said piston having a groove formed therein, said groove being in the circle in which the piston ports lie and being in communication with the piston ports and said plurality of valve holes, said grooves having a depth such that when said piston is moved toward said upper chamber so that hydraulic fluid flows from said upper chamber through said plurality of valve holes, said groove and said piston ports to said lower chamber while said return ports are closed by said non-return valve, the resistance to flow of hydraulic fluid through said groove is substantially less than the resistance to flow of hydraulic fluid through said piston ports, whereby upon angular displacement of said valve holes the resistance to hydraulic fluid flow through said piston is substantially unchanged although the hydraulic fluid travel distance through said piston may have increased, said groove having an outer peripheral wall formed such that said groove tapers outwardly toward the upper surface of said piston, said outer peripheral wall is reinforced with bonded iron powder and said piston is made of sintered materials.

7. A shock absorber as defined in claim 6 wherein said groove includes a plurality of equally spaced arcuate groove segments, and wherein said valve holes through said non-return valve are arranged at equal intervals, each of said plurality of arcuate groove segments having equal arc angles about the axis of said piston and wherein the angle of each said groove segment is equal to or greater than 360 degrees divided by the number of valve holes.

8. A shock absorber as defined in claim 6 wherein said outer peripheral wall of said groove is formed with a shoulder.

9. A shock absorber as defined in claim 6 wherein said outer peripheral wall of said groove is formed with a slant surface.

* * * * *